United States Patent
Park

(10) Patent No.: US 9,769,295 B2
(45) Date of Patent: *Sep. 19, 2017

(54) MOBILE TERMINAL FOR DISPLAYING NOTIFICATIONS AND METHOD OF CONTROLLING THE SAME

(71) Applicant: LG ELECTRONICS INC., Seoul (KR)

(72) Inventor: Hyungbin Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/492,939

(22) Filed: Apr. 20, 2017

(65) Prior Publication Data

US 2017/0223159 A1 Aug. 3, 2017

Related U.S. Application Data

(63) Continuation of application No. 14/740,983, filed on Jun. 16, 2015.

(30) Foreign Application Priority Data

Jun. 17, 2014 (KR) .................. 10-2014-0073709

(51) Int. Cl.
*H04M 11/04* (2006.01)
*H04M 1/66* (2006.01)
(Continued)

(52) U.S. Cl.
CPC ........ *H04M 1/0266* (2013.01); *G06F 3/0488* (2013.01); *H04M 1/72519* (2013.01);
(Continued)

(58) Field of Classification Search
CPC ........... H04M 1/0268; H04M 1/72519; H04M 1/72547; H04M 19/04; H04M 2250/22
(Continued)

(56) References Cited

U.S. PATENT DOCUMENTS

2006/0128404 A1  6/2006  Klassen et al.
2007/0156910 A1  7/2007  Christie et al.
(Continued)

FOREIGN PATENT DOCUMENTS

KR  10-2012-0030866 A  3/2012
KR  10-2013-0081617 A  7/2013
KR  10-2014-0066253 A  5/2014

*Primary Examiner* — Rafael Pérez-Gutiérrez
*Assistant Examiner* — Mark G. Pannell
(74) *Attorney, Agent, or Firm* — Birch, Stewart, Kolasch & Birch, LLP

(57) ABSTRACT

A mobile terminal including a wireless communication unit configured to provide wireless communication; a touch screen having a front surface and a lateral surface, wherein the touch screen is bent in the lateral surface; and a controller configured to associate first identification information identifying a first external terminal with a first display color unique to the first external terminal and a first display location the first external terminal on the lateral surface, associate second identification information identifying a second external terminal with a second display color the second external terminal and a second display location unique to the second external terminal on the lateral surface, wherein the second display color is different than the first display color and the second display location is different than the first display location, detect an occurrence of a first event related to the first identification information of the first external terminal, display a first notification object with the first display color at the first display location on the lateral surface in response to the occurrence of the first event, detect an occurrence of a second event related to the second (Continued)

identification information of the second external terminal, display a second notification object with the second display color at the second display location on the lateral surface in response to the occurrence of the second event while the first notification object is displayed with the first display color at the first display location on the lateral surface, receive a first drag touch input applied to the first notification object, display information related to the first event on the touch screen in response to the first drag touch input, receive a second drag touch input applied to the second notification object, and display information related to the second event on the touch screen in response to the second drag touch input.

24 Claims, 12 Drawing Sheets

(51) Int. Cl.
  *H04M 1/68* (2006.01)
  *H04M 3/16* (2006.01)
  *G06F 15/16* (2006.01)
  *H04M 1/02* (2006.01)
  *H04M 1/725* (2006.01)
  *G06F 3/0488* (2013.01)
  *G06F 3/041* (2006.01)

(52) U.S. Cl.
  CPC .. *G06F 3/0416* (2013.01); *G06F 2203/04102* (2013.01); *H04M 1/0268* (2013.01); *H04M 2250/22* (2013.01)

(58) Field of Classification Search
  USPC ........................................................ 455/566
  See application file for complete search history.

(56) References Cited

U.S. PATENT DOCUMENTS

| | | |
|---|---|---|
| 2008/0146285 A1 | 6/2008 | Lee et al. |
| 2009/0228462 A1 | 9/2009 | Frieder et al. |
| 2011/0281568 A1 | 11/2011 | Le Clech |
| 2011/0294467 A1 | 12/2011 | Kim et al. |
| 2012/0071207 A1 | 3/2012 | Yoo |
| 2013/0076649 A1 | 3/2013 | Myers et al. |
| 2013/0178248 A1 | 7/2013 | Kim |
| 2014/0024332 A1 | 1/2014 | Droste et al. |
| 2015/0031417 A1 | 1/2015 | Lee et al. |
| 2015/0149560 A1 | 5/2015 | Lee |
| 2015/0201062 A1 | 7/2015 | Shih et al. |

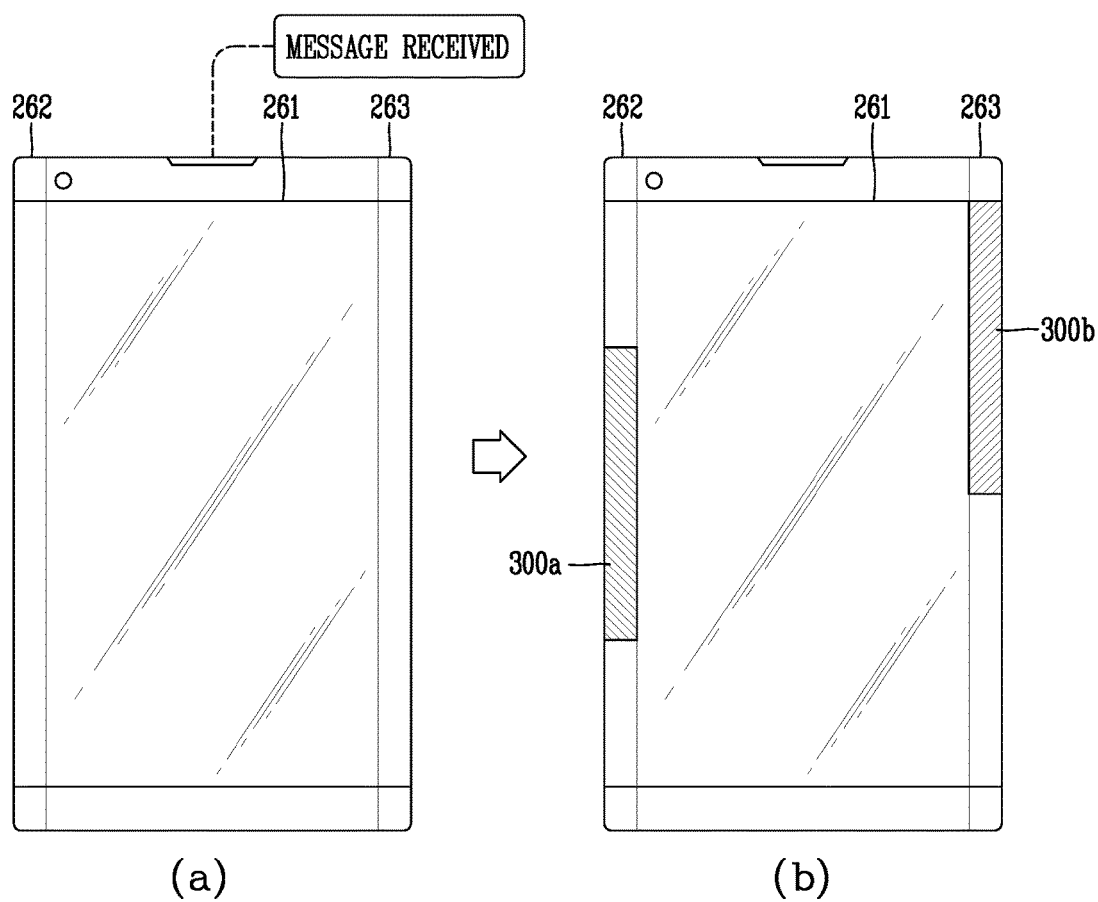

(a)

(b)

MOBILE TERMINAL FOR DISPLAYING NOTIFICATIONS AND METHOD OF CONTROLLING THE SAME

CROSS-REFERENCE TO RELATED APPLICATION

This application is a Continuation of co-pending application Ser. No. 14/740,983, filed on Jun. 16, 2015, which claims priority under 35 U.S.C. §119(a) to Application No. 10-2014-0073709, filed in Republic of Korea on Jun. 17, 2014, all of which are hereby expressly incorporated by reference into the present application.

BACKGROUND OF THE INVENTION

1. Field of the Invention

The present disclosure relates to a mobile terminal for using a display unit disposed on a lateral surface of a mobile terminal body and a control method thereof.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

The functionality of the mobile terminal has been diversified. For example, there are functions of data and voice communication, photo capture and video capture through a camera, voice recording, music file reproduction through a speaker system, and displaying an image or video on the display unit. Some terminals may additionally perform an electronic game play function or perform a multimedia play function. In particular, recent terminals may receive multicast signals for providing video contents such as broadcasts, videos, television programs, or the like.

As it becomes multifunctional, for example, such a terminal is allowed to capture still images or moving images, play music or video files, play games, receive broadcast and the like, so as to be implemented as an integrated multimedia player.

In order to support and enhance the functions of the terminal, the improvement of structural or software elements of the terminal may be taken into consideration.

As part of the improvement of the structural elements, mobile terminals having a structure in which the display unit is disposed on a rear and a lateral surface of the terminal as well as a front surface thereof have emerged.

Owing to the structural improvement, the needs of developing various UIs of the mobile terminal using a lateral display unit have been addressed.

SUMMARY OF THE INVENTION

Accordingly, the technical task of the present disclosure is to provide various information using a display unit disposed on a lateral surface of the terminal.

Another technical task of the present disclosure is to provide a mobile terminal for reducing battery consumption using a lateral display unit.

In order to accomplish the foregoing task of the present disclosure, there is provided a mobile terminal including a body having a front surface and a lateral surface, a display unit comprising a first region disposed on the front surface and a second region connected to the first region and disposed on the lateral surface, and a controller configured to display notification information associated with an event on the second region disposed on the lateral surface when the event occurs, wherein the display format of the notification information displayed on the second region is determined based on information associated with the event.

According to an embodiment, the information associated with the event may be at least one of a type of event, content of event, and identification information of an external terminal associated with the occurrence of an event, and the controller may determine the display location and display color with which the notification information is displayed using the information associated with the event.

According to an embodiment, the event may be an event in which a message is received from an external terminal, and information associated with the message received event may be the identification information of an external terminal that has transmitted the message and the content of the message, and the controller may control the display unit to display notification information indicating the identification information of the external terminal and the content of the message, respectively, with different display formats on the second region.

According to an embodiment, the controller may perform a function associated with an event indicated by the notification information based on a preset type of touch applied to a region displayed with the notification information on the second region.

According to an embodiment, the controller may control the display unit to display the execution screen information of a function associated with the event on the first region.

According to an embodiment, the controller may allow the notification information to disappear on the second region based on a preset type of touch applied to the notification information.

According to an embodiment, the mobile terminal may further include a user input unit configured to receive a control command from a user, wherein the controller executes a function linked with the notification information when a control command is received from the user input unit in a state that the notification information is displayed on the second region.

According to an embodiment, the notification information may be no longer displayed on the second region when the function linked with the notification information is executed.

According to an embodiment, the display format of the notification information may be configured by a user.

According to an embodiment, the controller may control the display unit to display a user input unit for receiving the display format of the notification information from the user on the first region.

There is provided a control method of a mobile terminal having a display unit comprising a first region disposed on a front surface of a body and a second region connected to the first region and disposed on a lateral surface of the body, and the method may include sensing the occurrence of an event, and displaying notification information indicating that the event has occurred on the second region disposed on the lateral surface, wherein the display format of the notification information displayed on the second region is determined based on information associated with the event.

According to an embodiment, the method may further include detecting information associated with the event when the event is sensed, wherein the display location and display color of the notification information are determined according to information associated with the detected event.

According to an embodiment, the method may further include executing a function associated with the event when a preset type of touch is applied to the notification information.

According to an embodiment, the function associated with the event may be displayed on the first region.

According to an embodiment, the notification information may disappear on the second region when a preset period of time has passed.

The present disclosure may determine the display format of notification information indicating the occurrence of an event on a lateral display unit based on information associated with the event, thereby intuitively notifying the information associated with the event to the user.

Furthermore, the present disclosure may notify that an event has occurred to the user even in a state that a front display unit is not activated using a lateral display unit. Through this, it may be possible to reduce battery consumption consumed to use the front display unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A, 3B, 3C and 3D are conceptual views for explaining the control method;

DETAILED DESCRIPTION OF THE INVENTION

Figure 1A:
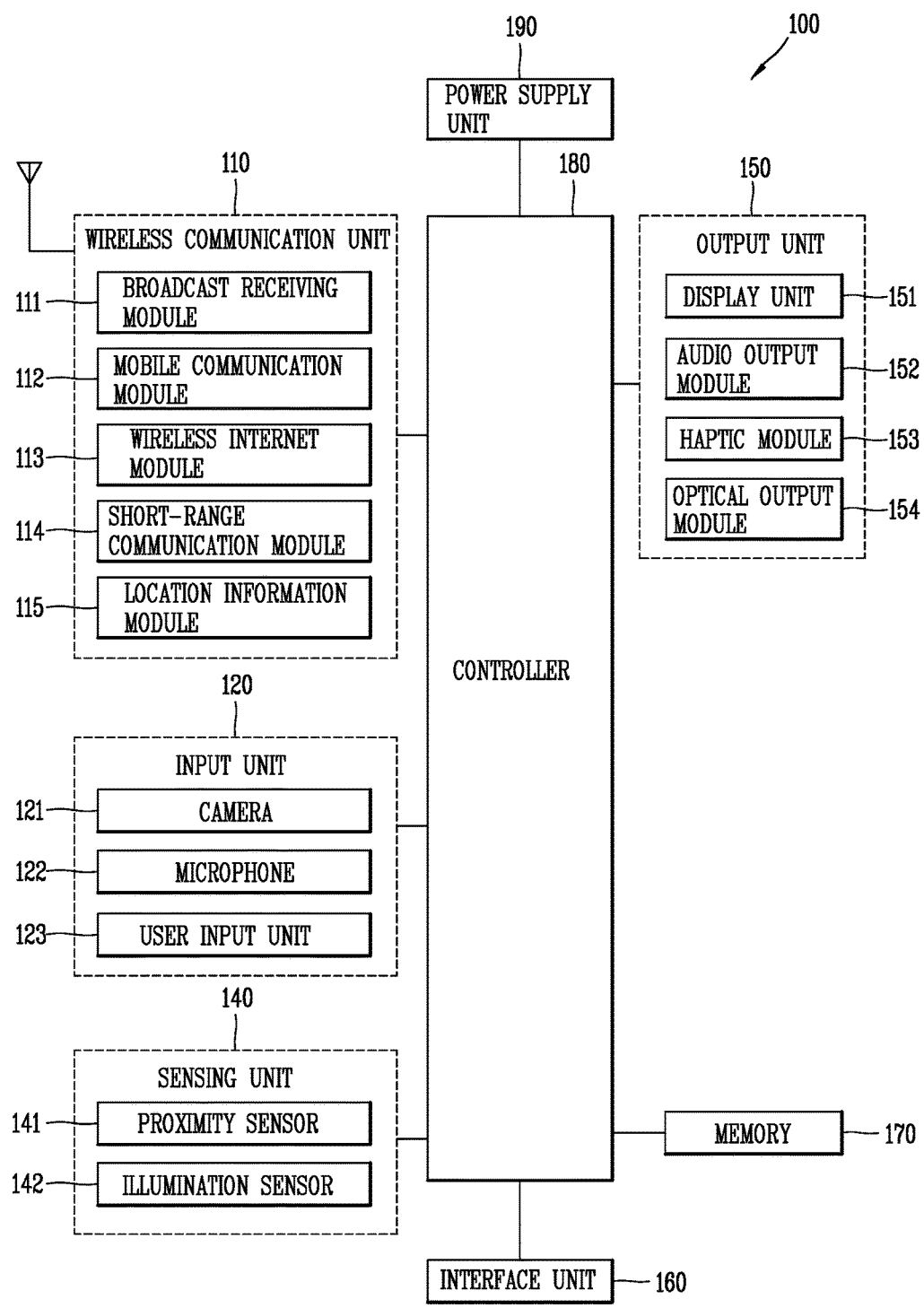
FIG. 1A is a block diagram illustrating a mobile terminal associated with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
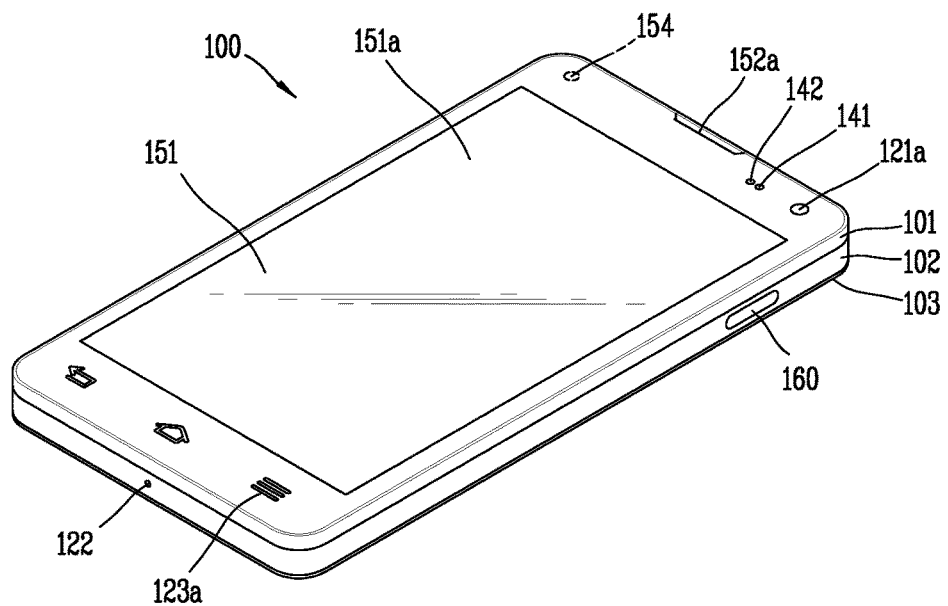
FIGS. 1B and 1C conceptual views in which an example of a mobile terminal associated with the present disclosure is seen from different directions.
Figure 1C:
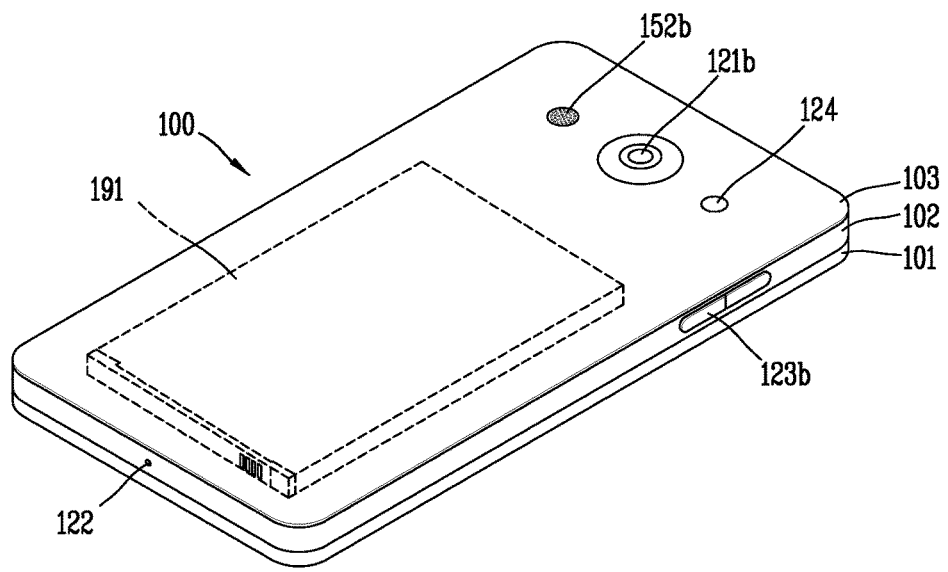

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1D:
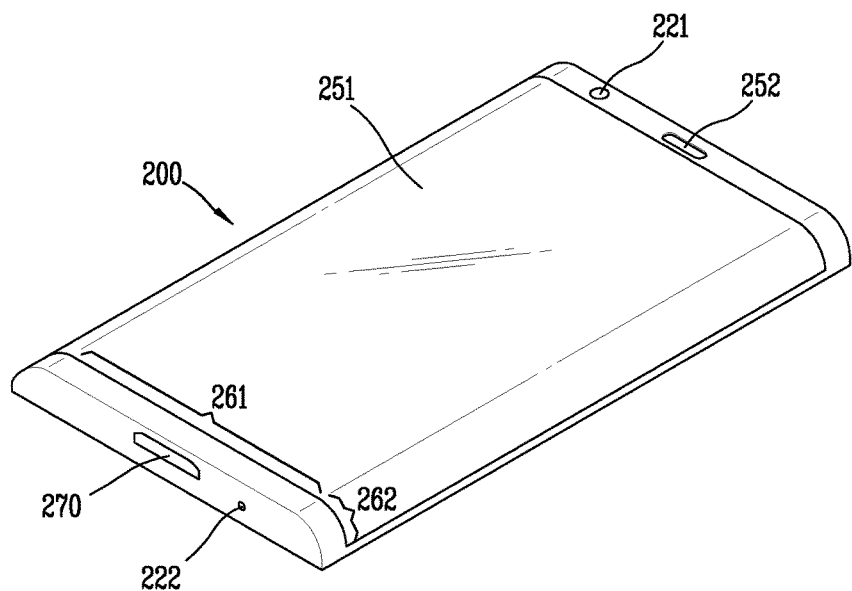
FIG. 1D is a front perspective view illustrating another example of a mobile terminal associated with the present disclosure.
Figure 1E:
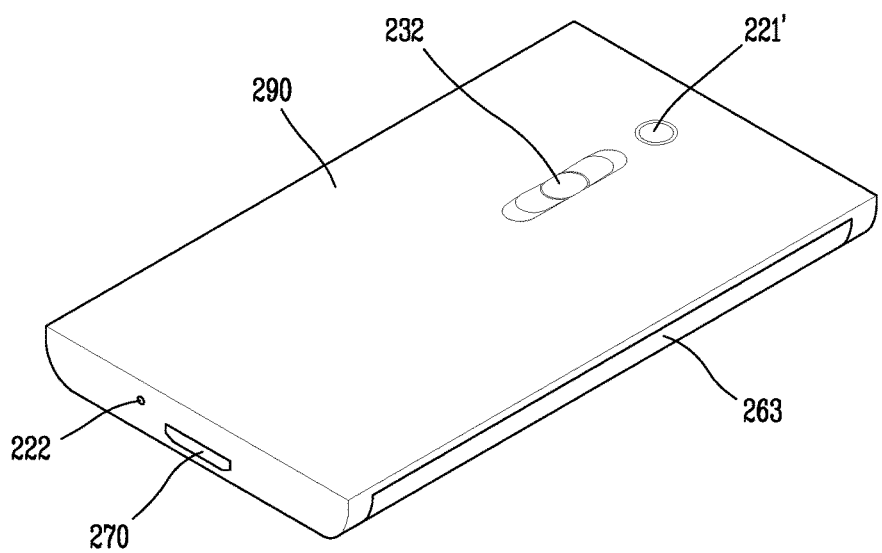
FIG. 1E is a rear perspective view of a mobile terminal illustrated in FIG. 1D.

On the other hand, a mobile terminal according to the present disclosure may have various design forms. Hereinafter, as one of the structural changes and improvements, a mobile terminal having a lateral display unit and a user interface using the same will be described. FIG. 1D is a front perspective view illustrating another example of a mobile terminal associated with the present disclosure, and FIG. 1E is a rear perspective view of a mobile terminal illustrated in FIG. 1D.

The mobile terminal 200 disclosed herein is provided with a bar-type terminal body. However, the present disclosure may not be necessarily limited to this type of terminal, but also may be applicable to various structures of terminals such as a slide type, a folder type, a swing type, a swivel type or the like, in which two and more bodies are combined with each other in a relatively movable manner.

The body includes a case (casing, housing, cover, etc.) forming an external appearance of the terminal. In this embodiment, the case may be divided into a front case 201 and a rear case 202. Various electronic elements are integrated into a space between the front case 201 and the rear case 202. At least one middle case may be additionally disposed between the front case 201 and the rear case 202.

The cases may be formed by injection-molding a synthetic resin or may be also formed of a metal material such as stainless steel (STS), titanium (Ti) or the like.

A display unit 251, an audio output unit 252, a camera module 221 and the like may be formed on the terminal body, mainly on the front case 201. An interface unit 270 and the like may be disposed on a lateral surface of the front case 201 and rear case 202.

The display unit 251 occupies most of the primary surface of the front case 202. In other words, the display unit is disposed on a front surface of the terminal, and formed to display visual information. The display unit 251 according to the present disclosure is implemented in a form of being extended to a front surface of the terminal as well as to another surface of the terminal. More specifically, the display unit 251 may include a first region 261 disposed on the front surface and a second region 262, 263 extended from the first region 261 and disposed on a lateral surface of the body. Here, the lateral surface may be a surface seen from a user when the user views the mobile terminal from the lateral surface (or the side).

On the other hand, at least part of the second region 262, 263 may be disposed on a front surface thereof. For example, the second region 262, 263 may be formed over a front surface and a front surface of the terminal. Here, whether or not the second region 262, 263 is seen from the front surface is determined according to a structure in which the first and the second region 261, 262, 263 are formed on the display unit 251.

For example, a window disposed on an upper surface of the display unit 251 is formed in a shape in which both the lateral surfaces are bent, and as a result, an external appearance of the front and lateral surfaces of the body is formed by the window. Accordingly, the first region 261 and second region 262, 263 may be connected to each other in a shape having no physical interface. In this case, the display unit 251 is formed in a bent shape, and may include display elements integrated to correspond to the window.

For another example, the display unit 251 may be a flexible display unit. The flexible display may include a flexible, bendable, twistable, foldable and rollable display. Here, the flexible display unit may include both typical flexible displays and electronic paper.

Here, typical flexible display may denote a light and non-fragile rigid display fabricated on a thin and flexible substrate that can be warped, bent, folded or rolled like a paper sheet while maintaining the display characteristics of a flat display in the related art.

Furthermore, electronic paper as a display technology to which a typical characteristic of ink is applied may be different from that of a typical flat panel display in which reflective light is used. Electronic paper may change a drawing or text using twist balls or electrophoresis using capsules.

In this manner, it may be possible to configure a terminal body having a form in which both lateral surfaces of the display unit is warped by flexible material properties.

On the other hand, a form in which a flexible display unit is extended to a front surface and both lateral surfaces thereof has been described in the above, but the present disclosure may be also configured with a form in which three independent display units are disposed on a front surface and both lateral surfaces thereof. For example, a front display unit 261 and a lateral display unit 262, 263 are independent display units, respectively, and may be configured with a form in which they are disposed in an adjacent manner.

The audio output unit 252 and a camera module 221 may be disposed in a region adjacent to one of both end portions of the display unit 251, and a front input unit (not shown) and a microphone 222 may be disposed in a region adjacent to the other end portion.

The front input unit as an example of the user input unit 230 (refer to FIG. 1) may include a plurality of manipulating units. The manipulating units may be commonly referred to as a manipulating portion, and any method may be employed if it is a tactile manner allowing the user to perform manipulation with a tactile feeling.

Furthermore, the display unit 251 may form a touch screen along with a touch sensor, and in this case, the touch screen may be a user input unit. Through this, it may be possible to have a configuration with no front input unit on a front surface of the terminal. In this case, a mobile terminal may be configured to enable input manipulation to the terminal body only through the display unit 251 and a rear input unit 232 which will be described later.

Referring to FIG. 1E, a camera module 221' may be additionally mounted on a rear surface of the terminal body, namely, the rear case 202. The camera module 221' has an image capturing direction, which is substantially opposite to the direction of the camera 221 (refer to FIG. 1D), and may have a different number of pixels from that of the camera module.

For example, it is preferable that the camera module 221 has a relatively small number of pixels enough not to cause a difficulty when the user captures his or her own face and immediately sends it to the other party during a video call or the like, and the camera module 221' has a relatively large number of pixels since the user often captures a general object but does not sends it immediately. The camera modules 221, 221' may be provided in the terminal body in a rotatable and popupable manner.

A flash and a mirror may be additionally disposed adjacent to the camera module 221'. The flash illuminates light toward an subject when capturing the subject with the camera module 221'. The mirror allows the user to look at his or her own face, or the like, in a reflected way when capturing himself or herself (in a self-portrait mode) by using the camera module 221'.

An audio output unit (not shown) may be additionally disposed on a rear surface of the terminal body. The audio output unit on a rear surface thereof together with the audio output unit 252 (refer to FIG. 3A) on a front surface thereof can implement a stereo function, and may be also used to implement a speaker phone mode during a phone call.

In other words, a second audio output unit configured with a speaker on a rear surface of the terminal may be formed along with the audio output unit 252 (first audio output unit) configured with a receiver on a front surface thereof.

A power supply unit 290 for supplying power to the portable terminal 200 may be mounted on the terminal body. The power supply unit 290 may be configured to be incorporated in the terminal body, or directly detachable from the outside of the terminal body.

According to the drawing, a rear input unit 232 may be disposed on a rear surface of the terminal body. The rear input unit 232 may be located at a lower portion of the camera module 221', for example.

The rear input unit 232 may be manipulated to receive a command for controlling the operation of the mobile terminal 200, and the received content may be set in various ways. For example, it may be possible to receive a command such as power on/off, start, end, scroll or the like, or a command such as volume adjustment output from the audio output unit 252, switching to a touch recognition mode of the display unit 251, or the like. However, the present disclosure may not be necessarily limited to this, and the terminal may include only either one or both of the front input unit and rear input unit 232.

On the other hand, as described above, the controller 180 (refer to FIG. 1A) may control the function of the terminal using a display unit disposed on a lateral surface of the terminal.

Hereinafter, a method of controlling the function of the terminal using display units disposed on both lateral surfaces thereof will be described in more detail with reference to the accompanying drawings.

For the sake of convenience of explanation, the second region 262 denotes a display region disposed at a left side of both lateral surfaces based on the front surface, and the third region 263 denotes a display region disposed at a right side of both lateral surfaces based on the front surface. Furthermore, the first region 261 denotes a display (front display) disposed on the front surface.

Furthermore, on the contrary, though it is illustrated that the display unit 251 according to the present disclosure includes display regions at both the left and the right sides thereof, the display unit 251 may further include a lateral display unit only at either one of the left and the right sides thereof based on the first region 261. However, according to the present disclosure, for the sake of convenience of explanation, the display unit 251 including display regions (or display units) at a front surface, a left and a right sides thereof, respectively, will be described as an example.

Moreover, according to the present disclosure, a front display unit (or first region) will be described using reference numeral "261", and a lateral display unit (or second region) will be described using reference numeral "262" or "263". Moreover, the content that can be applicable to both the front and lateral display unit will be described as a "display unit 251" instead of reference numerals indicating the front and lateral display units, regardless of distinguishing the front and lateral display unit.

Figure 2:
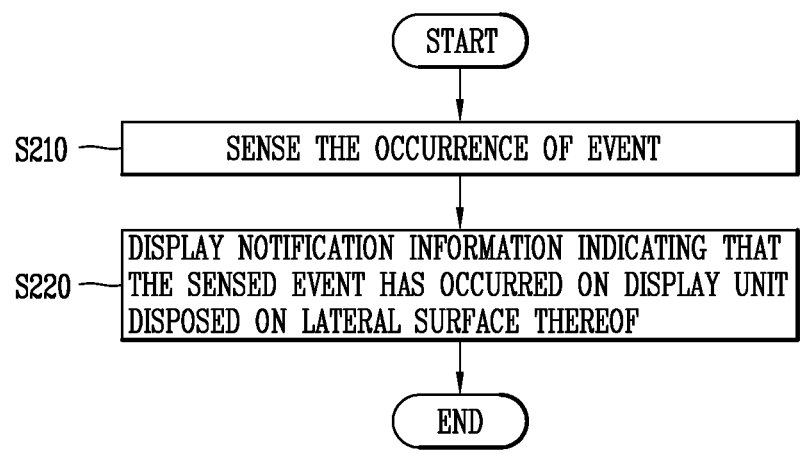
FIG. 2 is a flow chart illustrating a method of displaying notification information indicating the occurrence of an event on a lateral display unit in a mobile terminal according to an embodiment of the present disclosure.

Hereinafter, a method of performing various functions using a display unit having both lateral surfaces will be described in more detail with reference to the accompanying drawings. FIG. 2 is a flow chart illustrating a method of displaying notification information indicating the occurrence of an event on a lateral display unit, and FIGS. 3A, 3B, 3C and 3D are conceptual views for explaining the control method.

First, a mobile terminal according to an embodiment of the present disclosure may carry out the process of sensing the occurrence of an event (S210).

The event may be generated from the mobile terminal itself or generated by an external terminal. More specifically, the event may be an event in which a specific function installed in the mobile terminal is executed, an event in which preset configuration information of the mobile terminal is changed, an event in which information is received from an external terminal, and the like.

For example, the event may be an event in which the execution status of an application currently being executed on the mobile terminal is changed, an event in which the battery amount of the mobile terminal drops below a preset level, an event in which a message is received from an external terminal, and the like.

When the event occurs, a mobile terminal according to an embodiment of the present disclosure may display notification information indicating that an event has occurred.

Here, the present disclosure may use a lateral display unit in displaying the notification information. In other words, a mobile terminal according to the present disclosure may further include the lateral display unit 262, 263 as well as the front display unit 261 as illustrated in FIGS. 1D and 1E.

At this time, the controller 180 may individually or concurrently control the front display unit 261 and lateral display unit 262, 263. More specifically, the controller 180 may activate at least one of the front display unit 261 and lateral display unit 262, 263. Here, activating the display unit may denote turning on the illumination of the display unit to display screen information on the display unit. Furthermore, deactivating the display unit may denote turning off the illumination of the display unit not to display screen information on the display unit.

Furthermore, the controller 180 may control the front and lateral display units 261, 262, 263 to display screen information relevant to each other or display independent screen information irrelevant to each other on the front and lateral display units 261, 262, 263, respectively.

For example, the controller 180 may control the front and lateral display units 261, 262, 263 to display screen information associated with the same application over the entire region of the front and lateral display units 261, 262, 263. For another example, the controller 180 may display an execution screen of different applications on the front display unit 261 and lateral display unit 262, 263.

On the other hand, when the event occurs, the controller 180 provided in a mobile terminal according to the present disclosure may sense the occurrence of the event. Here, the controller 180 may execute a function associated with the event or display notification information indicating that the event has occurred to the user.

At this time, the controller 180 may display notification information indicating that the event has occurred on the lateral display unit 262, 263. In this case, the controller 180 may activate the lateral display unit 262, 263.

On the other hand, the front display unit 261 may be deactivated independently from (or regardless of) displaying notification information using the lateral display unit 262, 263. Furthermore, when the front display unit 261 is activated, screen information relevant to the occurrence of the event may be displayed or screen information irrelevant to the occurrence of the event may be displayed on the front display unit 261. In other words, the front display unit 261 may be controlled independently from the lateral display unit 262, 263.

The notification information may determine a display format displayed on the lateral display unit 262, 263 based on information associated with an event sensed on the mobile terminal. Here, the information associated with the event may be at least one of a type of event, content of event, and identification information of an external terminal associated with the occurrence of an event. For example, when a message is received from an external terminal, the information associated with the event may be the identification information of the external terminal or the content information of a message.

The display format of the notification information may denote a format displayed on the lateral display unit. More specifically, the display format of the notification information may be at least one of display color and display location. Furthermore, the display format of the notification information may include all formats in which a graphic object is displayable such as an animation effect, a movement of a graphic object, and the like. Hereinafter, the display color and display location will be described, but the present disclosure may be also applicable to all displayable formats.

Furthermore, the display format of the notification information may be preset with respect to information associated with an event or selected by a user. More specifically, the display format of the notification information may be stored in the memory unit 170 in connection with information associated with an event, respectively. In this case, the controller 180 may detect a display format stored in the memory unit 170 to determine the display format of notification information according to information associated with an event.

Furthermore, the display format of the notification information may be pre-configured by a user. For example, the user may select a display color with respect to the identification information of an external terminal, respectively, to store it in the memory unit 170.

Furthermore, when there are a plurality of information associated with an event, the display format of the notification information may be configured with different display formats with respect to the plurality of information, respectively. In this case, the controller 180 may display notification information with the different display formats in a combined or individual manner.

Furthermore, the controller 180 may perform a function associated with an event indicated by the notification information based on a preset type of touch applied to the notification information.

Moreover, when a control command is received through an additional user input unit in a state that the notification information is displayed on the lateral display unit 262, 263, the controller 180 may perform a function associated with the notification information.

On the other hand, a preset condition is satisfied, the notification information is no longer displayed. For example, the preset condition may be the passage of a predetermined period of time or the application of a preset type of touch.

Hereinafter, a method of determining the display format of notification information based on information associated with an event will be described in more detail with reference to the accompanying drawings.

For example, referring to FIG. 3A(a), the controller 180 may determine the display format of notification information indicating each event based on the type of an event sensed on the mobile terminal.

More specifically, the controller 180 may sense an event in which a message is received from an external terminal. In this case, as illustrated in FIG. 3A(b), the controller 180 may display notification information 300*a* indicating the message received event on either one display unit 262 between the display units disposed on the right and left sides of the lateral display unit 262, 263.

Moreover, when an event (for example, an event in which the battery remaining amount is below a preset amount) different from the message received event occurs, the controller 180 may display notification information 300*b* with a different display format from the notification information 300*a* indicating the message received event on the other one display unit 263 different from the either one display unit 262.

For another example, the controller 180 may determine the display format of notification information associated with an event based on the identification information of an external terminal associated with the occurrence of the event and the type of the event. More specifically, as illustrated in FIG. 3B(a), when a message is received, the controller 180 may detect the identification information of an external terminal that has transmitted the message.

Then, the controller 180 may determine the display format of notification information according to the identification information and type of the event. At this time, the controller 180 may determine the display format of the notification information by combining a display format corresponding to the identification information with a display format corresponding to the type of the event.

For example, the user may select the display color of notification information as red for an external terminal referred to as "A" and the display color of notification information as blue for an external terminal referred to as "B" to store them in the memory unit 170. Furthermore, the user may determine the right lateral display unit 263 as a display location of notification information.

Figure 3B:
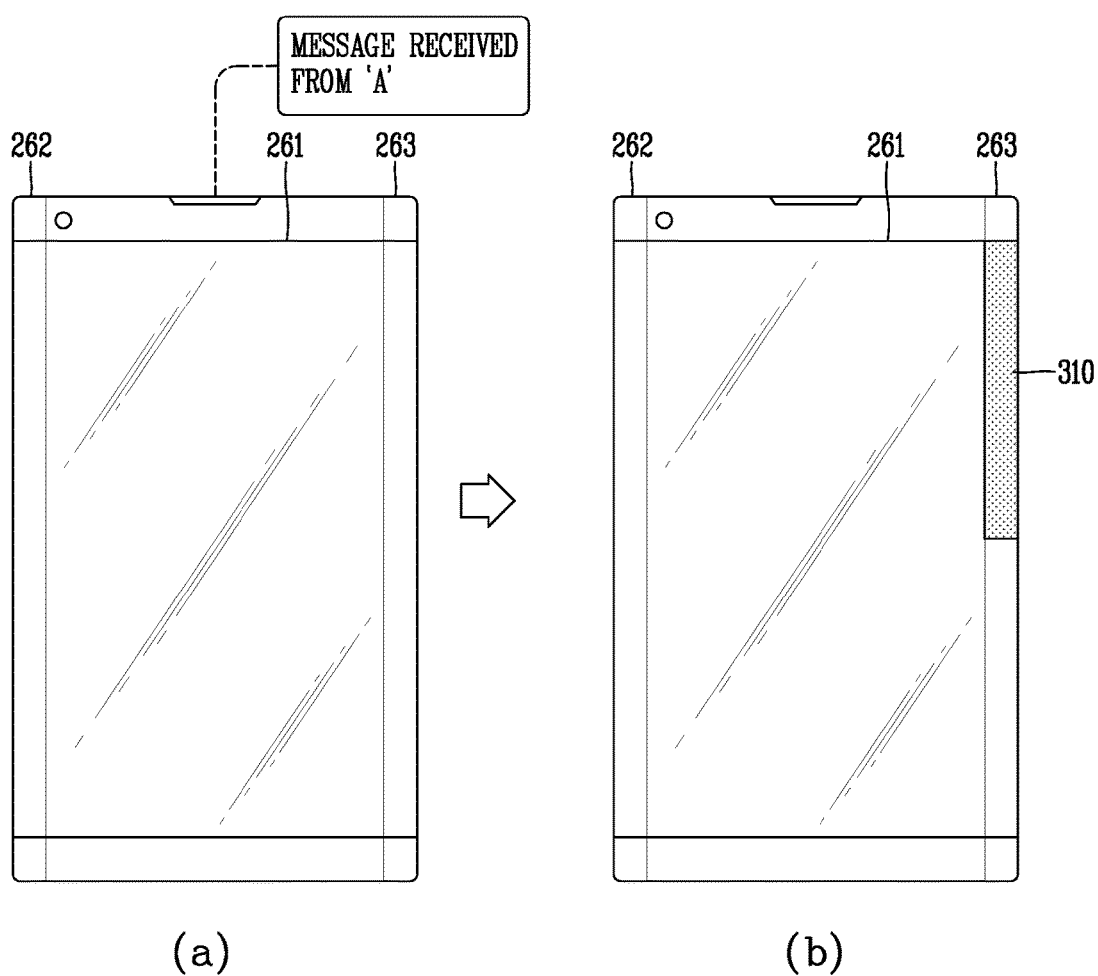

Here, as illustrated in FIG. 3B(b), when a message is received from "A", the controller 180 may display notification information 310 with blue on the right lateral display unit 263 between the lateral display units 262, 263. Through this, the user may know that a message has been received from "A".

Figure 3C:
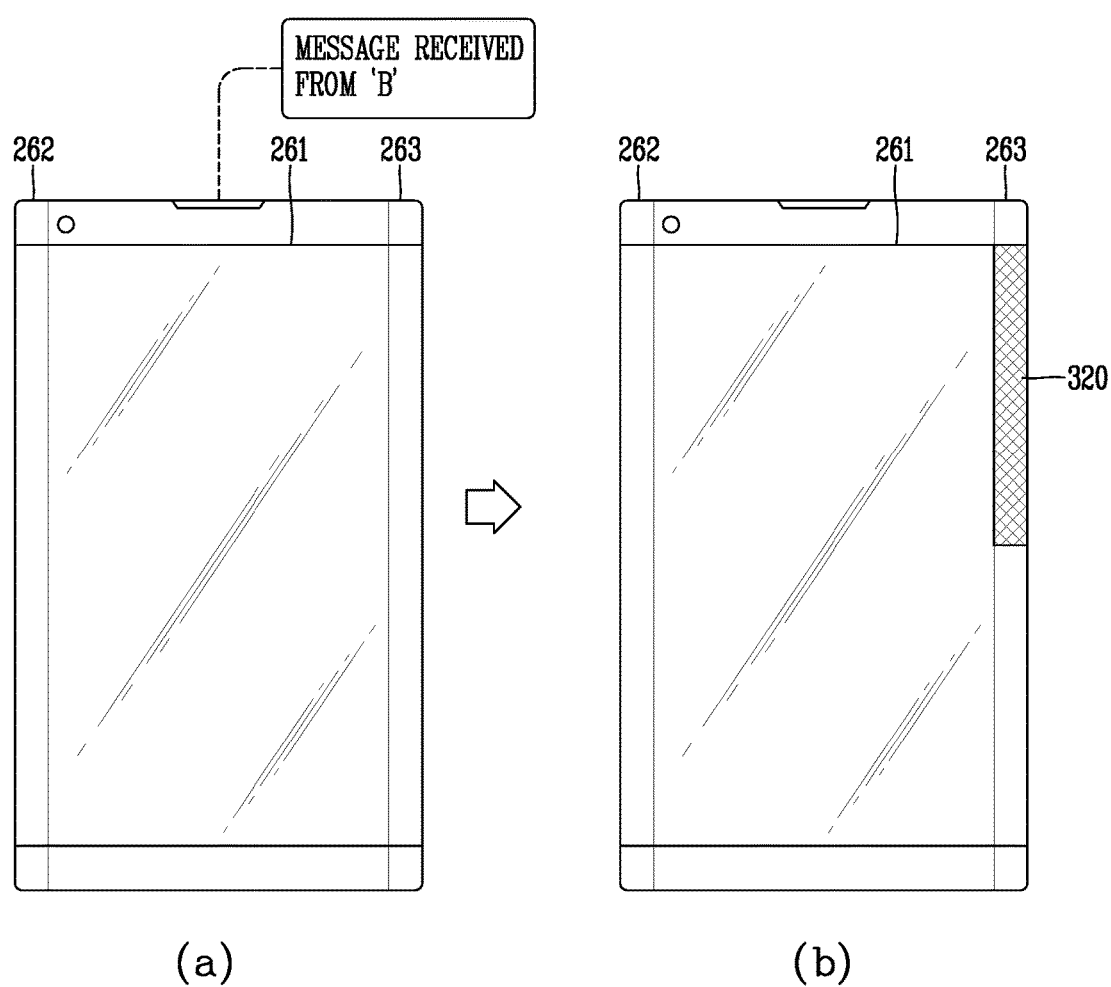

Furthermore, as illustrated in FIGS. 3C(a) and 3C(b), when a message is received from "B", the controller 180 may display notification information 320 with red on the right lateral display unit 263. Through this, the user may know that a message has been received from "B".

For another example, the controller 180 may determined the display format of notification information based on a type of event, content of event, and identification information associated with the occurrence of an event.

Here, for the display format of notification information, the controller 180 may combine display formats corresponding to information associated with an event, respectively, to determine one display format, but also individually display notification information indicating the display formats corresponding to information associated with the event, respectively.

Figure 3D:
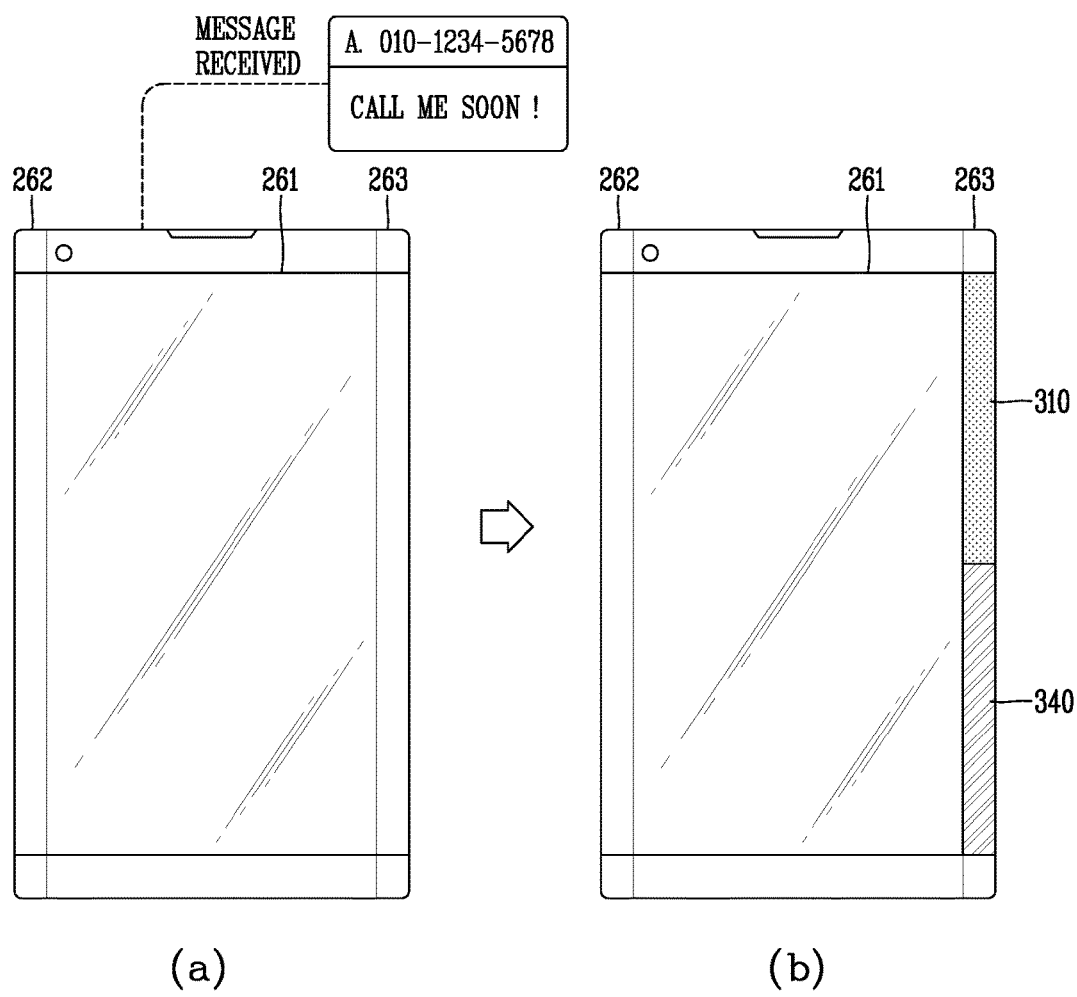

For example, as illustrated in FIG. 3D(a), when a message is received from "A", the controller 180 may analyze the content of the message. At this time, the controller 180 may compare a preset word in the memory unit 170 with the content of the message to analyze the content of the message.

When a preset word is contained in the content of the message, the controller 180 may determine a display format corresponding to the preset word as the display format of the notification information. For example, a display format corresponding to a preset word may be a display format with yellow at a lower right side of the right lateral display unit 263.

On the other hand, the controller 180 may combine a display format corresponding to the type of the event (for example, a display location set to a right region 263 of the lateral display unit) with a display format corresponding to the identification information of an external terminal associated with the occurrence of the event (for example, a blue display color is set to identification information referred to as "A") to determine the display format of one notification information 310.

Moreover, the controller 180 may additionally generate notification information 340 different from the one notification information 310 according to the content of the message. At this time, the display format of the different notification information 340 may be configured based on the content of the message.

In this case, the controller 180 may display the one notification information 310 and the different notification information 340 on the lateral display unit 263 at the same time. Through this, the user may know that a message has been received from "A" and a specific word is contained in the content of the message. For example, when the specific word is "emergency", "contact", the user determine the importance of the content of the message without directly checking the content of the message.

In the above, a method of displaying notification information using only a lateral display unit even in a state that a front display unit is not activated based on information associated with an event has been described. According to the present disclosure, the display format may be determined based on information associated with an event to provide the information associated with the event to a user. In other words, the user may know the information associated with the event with only a display format of notification information displayed on the lateral display unit without activating the front display unit. Furthermore, the lateral display unit may be used, thereby allowing the user to reduce battery consumption consumed to activate the front display unit.

Figure 4A:
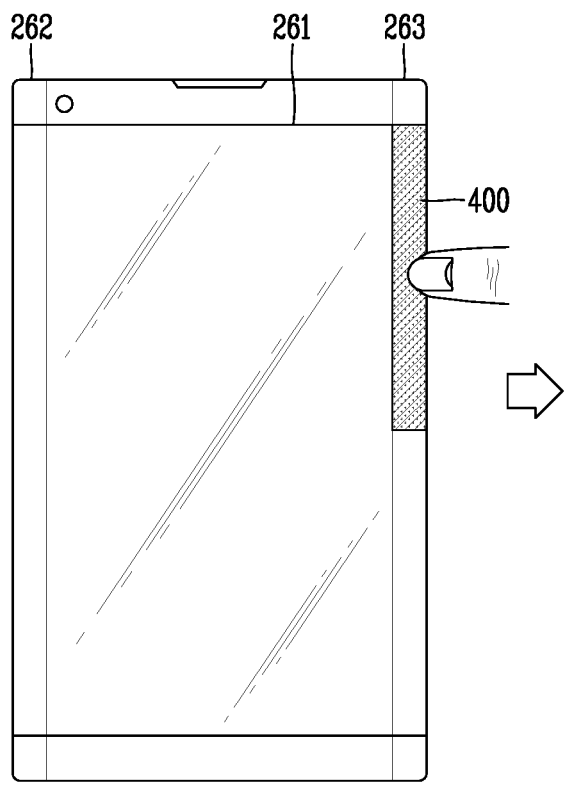
FIGS. 4A and 4B are conceptual views illustrating an embodiment of using notification information displayed on a lateral display unit.
Figure 4A:
Figure 4B:
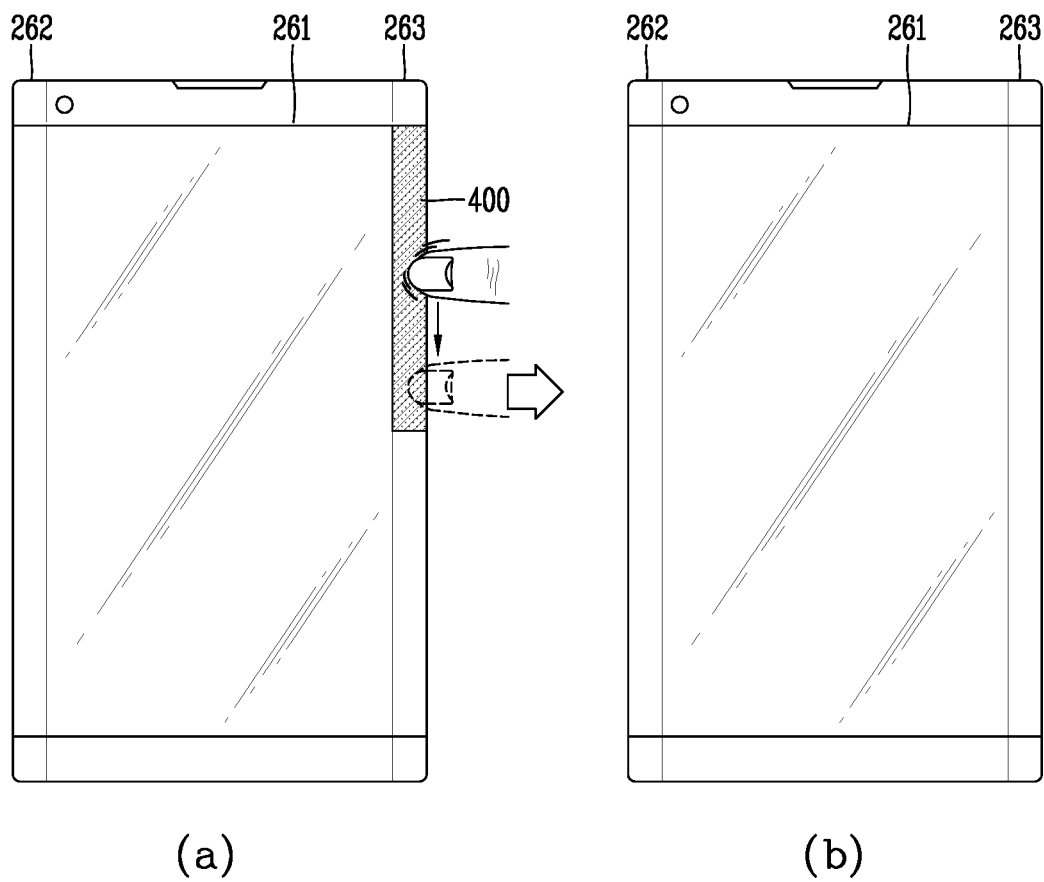

Hereinafter, a method of using notification information displayed on a lateral display unit will be described. FIGS. 4A and 4B are conceptual views illustrating an embodiment of using notification information displayed on a lateral display unit.

When the occurrence of an event is sensed, the controller 180 may display notification information indicating the occurrence of the event on the lateral display unit 262, 263. At this time, the controller 180 may perform a function associated with an event indicated by the notification information based on a preset type of touch to the notification information or a control command through an additional user input unit. Here, the controller 180 may display an execution screen of the function associated with the event on the front display unit 261.

More specifically, as illustrated in FIG. 4A(a), when the event occurs, the controller 180 may activate the right side 263 of the lateral display unit, and display notification information 410 indicating the occurrence of the event.

Here, when a preset type of touch is applied to the notification information 410, the controller 180 may perform a function associated with the event. In other words, the user may perform control as well as an event using notification information displayed on the lateral display unit 262.

The preset type of touch may be various touches such as a drag touch, a short touch, a long touch, a multi-touch, and the like. Furthermore, the preset type of touch may be preset when the mobile terminal is shipped out of the factory.

Furthermore, the function associated with an event may be a function that should be carried out by a user in connection with the event, such as a function of executing an application associated with the event, a function of displaying the content of the event on the display unit, and the like.

For example, the controller 180 may sense a message being received from an external terminal. At this time, as illustrated in FIG. 4A(a), the user may apply a touch to a region displayed with notification information 410 indicating the reception of the message. Here, as illustrated in FIG. 4A(b), the controller 180 may execute an application associated with the message to display the content of the message.

At this time, the execution screen of an application associated with the message may be displayed on the front display unit 261. In other words, the controller 180 may activate the front display unit 261, and display the content of the message on the front display unit 261.

On the other hand, the controller 180 may allow the notification information to disappear on the lateral display unit based on a preset type of touch applied thereto. For example, as illustrated in FIG. 4B(a), the user may apply a drag input in a downward direction from the top to the notification information 400. In this case, as illustrated in FIG. 4B(b), the controller 180 may no longer display the notification information 400 on the lateral display unit 263. Through this, the user may no longer receive the notification information 400.

Furthermore, the communication device 400 may disappear by the user, but also automatically disappear after a predetermined period of time has passed. At this time, when a predetermined period of time has passed without any touch manipulation to the notification information 400, the controller 180 may control the notification information 400 not to be no longer displayed on the display unit.

On the other hand, in the above description, a method of displaying screen information on the front display unit 261 through a touch manipulation to notification information displayed on the lateral display unit 263 has been described, but the screen information may be also displayed on the lateral display unit 262. In this case, the user may perform manipulation associated with an event without using the front display unit 261, thereby reducing the battery amount consumed in the front display unit 261.

In the above, a method of performing a function using notification information displayed on a lateral display unit has been described. Through this, the user may simply perform a function associated with an event using the lateral display unit.

Figure 5:
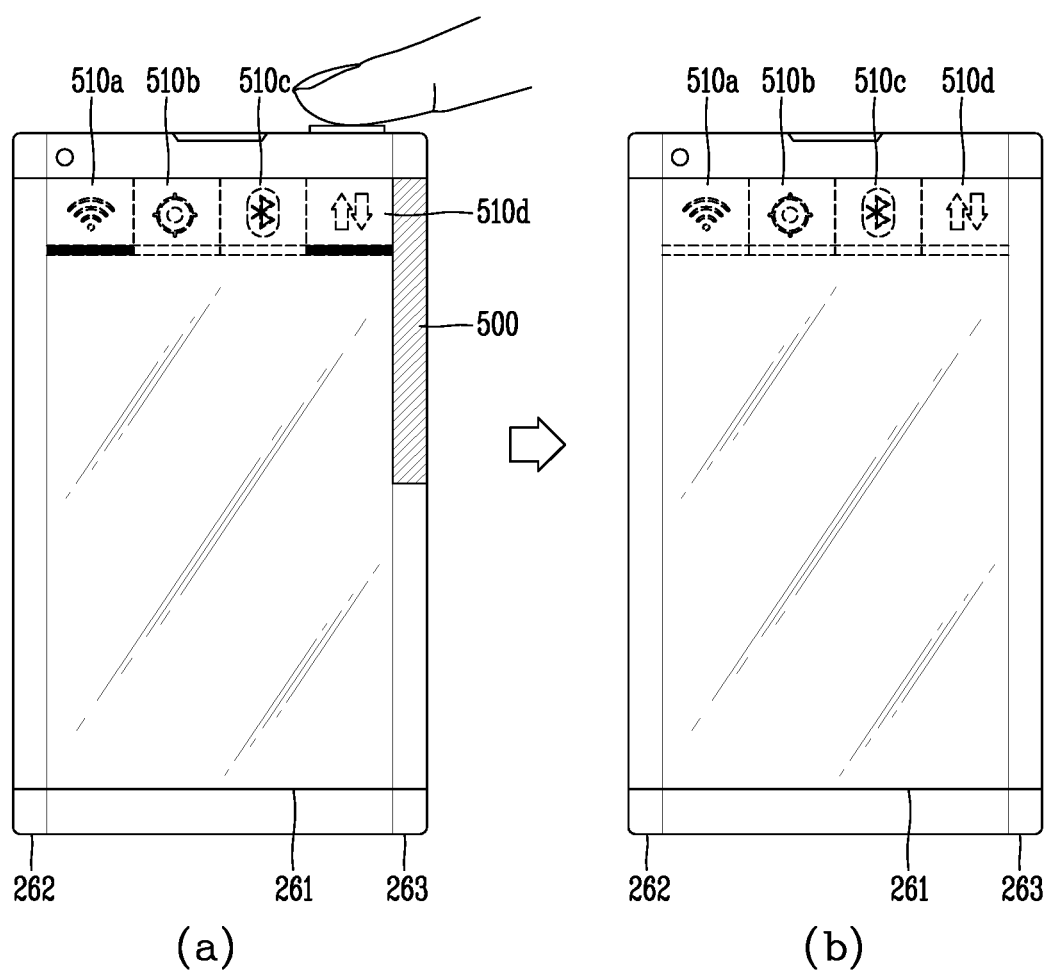
FIG. 5 is a conceptual view for explaining a case where a control command is received through an additional user input unit in a state that notification information is displayed on a lateral display unit.

Hereinafter, a method of receiving a control command through an additional user input unit in a state that notification information is displayed on a lateral display unit will be described. FIG. 5 is a conceptual view for explaining a case where a control command is received through an additional user input unit in a state that notification information is displayed on a lateral display unit.

A mobile terminal according to the present disclosure may further include a user input unit for receiving a user's control command. The user input unit may be configured with a hardware key and a software key. For example, as illustrated in FIG. 5A, the user input unit may be a hardware key disposed on one surface of the body.

On the other hand, when an additional input is received through the user input unit in a state that notification information indicating the occurrence of an event is displayed on a lateral display unit, the controller 180 may perform a function associated with the event.

More specifically, the controller 180 may sense that an event associated with the basic environment configuration of a mobile terminal. Here, the event associated with the basic environment configuration may be an event associated with the basic configuration of a mobile terminal such as an event in which the battery remaining amount is below a preset amount, an event in which a communication signal of the wireless communication unit drops below a preset level, and the like. At this time, the display format of notification information indicating the occurrence of an event may be different from each other according to the type of the event.

For example, as illustrated in FIG. 5A, when a communication signal received from the wireless communication unit drops below a preset level, notification information 410 indicating this may be displayed on the lateral display unit 263. At this time, the user may check the display format of the notification information 410 to determine the current status of a mobile terminal. Here, an icon indicating the wireless communication unit displayed with a dotted line is not shown in actuality, but displayed on the drawing for the sake of convenience of explanation.

The examples of the wireless communication unit may include Wi-Fi 510*a*, GPS 510*b*, Bluetooth 510*c*, 3G/4G 510*d*, and the like as illustrated in FIG. 5A. At this time, the Wi-Fi 510*a* and 3G/4G 510*d* may be activated and the Bluetooth 510*c* may be deactivated in FIG. 5A. Here, activation may denote a state in which wireless communication is enabled using the wireless communication method, and deactivation may denote an opposite case to that.

On the other hand, as illustrated in FIG. 5B, when a user input is received through the user input unit, the controller 180 may deactivate the wireless communication unit that is currently activated.

Through this, the present disclosure may determine the current status of a mobile terminal using only the notification information of a lateral display unit, and moreover, change the status of the mobile terminal using only the lateral display unit without using a front display unit.

Figure 6:
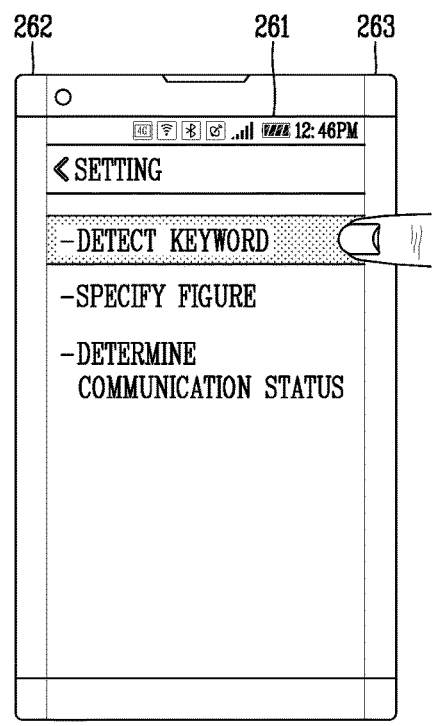
FIG. 6 is a conceptual view illustrating an embodiment of a user input unit for selecting the display format of notification information associated with the occurrence of an event.
Figure 6:
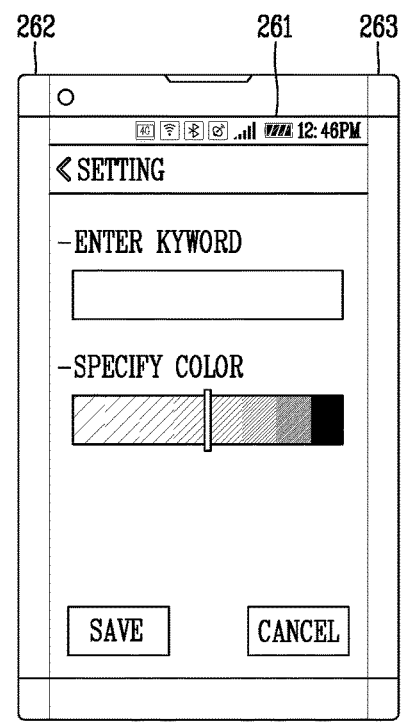
Figure 6:
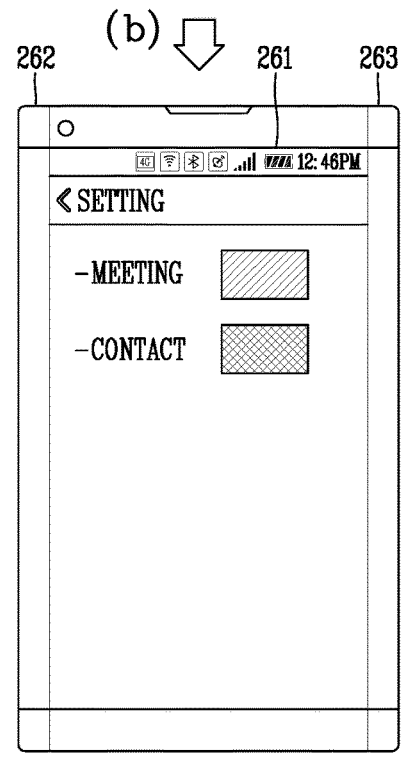

Hereinafter, a user interface for selecting a display format of notification information associated with the occurrence of an event will be described. FIG. 6 is a conceptual view illustrating an embodiment of a user input unit for selecting the display format of notification information associated with the occurrence of an event.

The controller 180 may provide a user interface to configure the display format of notification information associated with an event by a user's selection. Here, the user interface may denote screen information allowing the user to select a display format.

For example, as illustrated in FIG. 6, the controller 180 may display screen information for determining the display format of notification information according to information associated with an event on the display unit 251. For example, the controller 180 may display items such as "detect keyword", "specify figure" and "determine communication status", and the like on the display unit 251.

Here, as illustrated in FIG. 6B, when a user selects an item "detect keyword", the controller 180 may display screen information capable of receiving a keyword from the user and screen information capable of configuring a display format of notification information, more particularly, a display color, when an event associated with the keyword occurs. Through this, the user may directly configure a keyword and a display color of notification information according to the keyword.

For example, as illustrated in FIG. 6C, the user may configure red to a keyword "meeting", and blue to a keyword "contact". Through this, the user may know which event has occurred only with the display color of notification information.

The present disclosure may determine the display format of notification information indicating the occurrence of an event on a lateral display unit based on information associated with the event, thereby intuitively notifying the information associated with the event to the user.

Furthermore, the present disclosure may notify that an event has occurred to the user even in a state that a front display unit is not activated using a lateral display unit. Through this, it may be possible to reduce battery consumption consumed to use the front display unit.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
   a wireless communication unit configured to provide wireless communication;
   a touch screen having a front surface and a lateral surface, wherein the touch screen is bent in the lateral surface; and
   a controller configured to:
   display a user interface on the touch screen for setting a first display location and a first display color to a first external terminal, and for setting a second display location and a second display color to a second external terminal;
   associate first identification information identifying the first external terminal with the first display color and the first display location set for the first external terminal;
   associate second identification information identifying the second external terminal with the second display color and the second display location set for the second external terminal, wherein the second display color is different than the first display color;
   detect an occurrence of a first event received from the first external terminal;
   in response to the occurrence of the first event received from the first external terminal, display a first notification object for the first event received from the first external terminal with the first display color at the first display location on the lateral surface;
   detect an occurrence of a first event received from the second external terminal;
   in response to the occurrence of the first event received from the second external terminal while the first notification object is displayed, display a second notification object for the first event received from the second external terminal with the second display color at the second display location on the lateral surface;
   receive a first drag touch input applied to the first notification object;
   display information related to the first event received from the first external terminal on the front surface of the touch screen in response to the first drag touch input;
   receive a second drag touch input applied to the second notification object; and
   display information related to the first event received from the second external terminal on the front surface of the touch screen in response to the second drag touch input,
   wherein the controller is further configured to:
   detect an occurrence of a second event received from the first external terminal;
   in response to the occurrence of the second event received from the first external terminal, display the first notification object for the second event received from the first external terminal with the same first display color at the same first display location on the lateral surface;

detect an occurrence of a second event received from the second external terminal;

in response to the occurrence of the second event received from the second external terminal while the first notification object is displayed, display the second notification object for the second event received from the second external terminal with the same second display color at the same second display location on the lateral surface;

receive an additional first drag touch input applied to the first notification object;

display information related to the second event received from the first external terminal on the front surface of the touch screen in response to the additional first drag touch input;

receive an additional second drag touch input applied to the second notification object; and display information related to the second event received from the second external terminal on the front surface of the touch screen in response to the additional second drag touch input.

2. The mobile terminal according to claim 1, wherein the first notification object is displayed on the lateral surface without displaying the first notification object on the front surface of the touch screen, and wherein the second notification object is displayed on the lateral surface without displaying the second notification object on the front surface of the touch screen.

3. The mobile terminal according to claim 1, wherein the lateral surface of the touch screen includes a left side and a right side.

4. The mobile terminal according to claim 1, wherein the first and second events include at least one of a message reception, a call signal reception, a missed call, an alarm, a schedule notice, an email reception, and information reception through an application.

5. The mobile terminal according to claim 1, wherein the controller is further configured to activate the lateral surface of the touch screen and display the first notification object and the second notification object on the lateral surface while the front surface of the touch screen is deactivated.

6. The mobile terminal according to claim 1, wherein the controller is further configured to stop displaying the first notification object in response to the first drag touch input and stop displaying the second notification object in response to the second drag touch input.

7. The mobile terminal according to claim 1, wherein the controller is further configured to stop displaying the first notification object and the second notification object on the lateral surface of the touch screen after a predetermined period of time has passed.

8. The mobile terminal according to claim 1, wherein the first notification object and the second notification object are displayed together on a right side or a left side of the lateral surface.

9. The mobile terminal according to claim 1, wherein the controller is further configured to display screen information on the front surface of the touch screen before the first or second events occur, and wherein the screen information displayed on the front surface of the touch screen is irrelevant to the first or second events.

10. The mobile terminal according to claim 1, wherein the first notification object and the second notification object include bar-shaped notification icons.

11. The mobile terminal according to claim 1, wherein the first notification object and the second notification object comprise blank solid-color icons.

12. The mobile terminal according to claim 1, wherein the first external terminal and the second external terminal are selected by a user.

13. The mobile terminal according to claim 1, wherein the first external terminal and the second external terminal are set according to a respective mobile terminal identification of the first external terminal and the second external terminal.

14. The mobile terminal according to claim 1, wherein the front surface of the touch screen is controlled independently from the lateral surface of the touch screen.

15. A method of controlling mobile terminal including a touch screen having a front surface and a lateral surface, wherein the touch screen is bent in the lateral surface, the method comprising:

displaying a user interface on the touch screen for setting a first display location and a first display color to a first external terminal, and for setting a second display location and a second display color to a second external terminal;

associating, via a controller of the mobile terminal, first identification information identifying the first external terminal with the first display color and the first display location set for the first external terminal;

associating, via the controller, second identification information identifying the second external terminal with the second display color and the second display location set for the second external terminal, wherein the second display color is different than the first display color;

detecting, via the controller, an occurrence of a first event received from the first external terminal;

in response to the occurrence of the first event received from the first external terminal, displaying a first notification object for the first event received from the first external terminal with the first display color at the first display location on the lateral surface;

detecting, via the controller, an occurrence of a first event received from the second external terminal;

in response to the occurrence of the first event received from the second external terminal while the first notification object is displayed, displaying a second notification object for the first event received from the second external terminal with the second display color at the second display location on the lateral surface;

receiving a first drag touch input applied to the first notification object;

displaying information related to the first event received from the first external terminal on the front surface of the touch screen in response to the first drag touch input;

receiving a second drag touch input applied to the second notification object; and displaying information related to the first event received from the second external terminal on the front surface of the touch screen in response to the second drag touch input, wherein the method further comprises:

detecting, via the controller, an occurrence of a second event received from the first external terminal;

in response to the occurrence of the second event received from the first external terminal, displaying the first notification object for the second event received from the first external terminal with the same first display color at the same first display location on the lateral surface;

detecting, via the controller, an occurrence of a second event received from the second external terminal;

in response to the occurrence of the second event received from the second external terminal while the first notification object is displayed, displaying the second notification object for the second event received from the second external terminal with the same second display color at the same second display location on the lateral surface;

receiving an additional first drag touch input applied to the first notification object;

displaying information related to the second event received from the first external terminal on the front surface of the touch screen in response to the additional first drag touch input;

receiving an additional second drag touch input applied to the second notification object; and displaying information related to the second event received from the second external terminal on the front surface of the touch screen in response to the additional second drag touch input.

16. The method according to claim 15, wherein the first notification object is displayed on the lateral surface without displaying the first notification object on the front surface of the touch screen, and wherein the second notification object is displayed on the lateral surface without displaying the second notification object on the front surface of the touch screen.

17. The method according to claim 15, wherein the lateral surface of the touch screen includes a left side and a right side.

18. The method according to claim 15, wherein the first and second events include at least one of a message reception, a call signal reception, a missed call, an alarm, a schedule notice, an email reception, and information reception through an application.

19. The method according to claim 15, further comprising:

activating, via the controller, the lateral surface of the touch screen and displaying the first notification object and the second notification object on the lateral surface while the front surface of the touch screen is deactivated.

20. The method according to claim 15, further comprising:

stop displaying the first notification object in response to the first drag touch input and stop displaying the second notification object in response to the second drag touch input.

21. The method according to claim 15, further comprising:

stop displaying the first notification object and the second notification object on the lateral surface of the touch screen after a predetermined period of time has passed.

22. The method according to claim 15, wherein the first notification object and the second notification object are displayed together on a right side or a left side of the lateral surface.

23. The method according to claim 15, further comprising:

displaying screen information on the front surface of the touch screen when the first or second events occur, wherein the screen information displayed on the front surface of the touch screen is irrelevant to the first or second events.

24. The method according to claim 15, wherein the first notification object and the second notification object include bar-shaped notification icons.

* * * * *